United States Patent [19]

Kim

[11] Patent Number: 5,398,882
[45] Date of Patent: Mar. 21, 1995

[54] SUPPLY REEL BRAKE MECHANISM FOR A VIDEO CASSETTE RECORDER

[75] Inventor: Myeong-Seop Kim, Seoul, Rep. of Korea

[73] Assignee: Daewoo Electronics Co., Ltd., Seoul, Rep. of Korea

[21] Appl. No.: 123,511

[22] Filed: Sep. 17, 1993

[30] Foreign Application Priority Data

Sep. 18, 1992 [KR] Rep. of Korea ............ 92-17739

[51] Int. Cl.⁶ ............................................. G11B 15/48
[52] U.S. Cl. ............................................. 242/355.1
[58] Field of Search ............... 242/355, 355.1, 355.2, 242/421; 360/74.3, 96.3; 188/68, 69

[56] References Cited

U.S. PATENT DOCUMENTS

| | | | |
|---|---|---|---|
| 4,899,951 | 2/1990 | Okada et al. | 242/355.2 |
| 4,914,536 | 4/1990 | Yamanaka | 242/355.1 X |
| 5,140,475 | 8/1992 | Tana053985115 | 242/355.1 X |
| 5,150,265 | 9/1992 | Tanaka | 242/355.1 X |
| 5,217,180 | 6/1993 | Ruyten et al. | 242/355.1 |
| 5,301,897 | 4/1994 | Park | 242/355.1 |
| 5,318,241 | 6/1994 | Morimoto | 242/355.1 X |

Primary Examiner—Daniel P. Stodola
Assistant Examiner—John P. Darling
Attorney, Agent, or Firm—William F. Pinsak

[57] ABSTRACT

A supply reel brake mechanism for a VCR which carries out the supply reel braking operation through the use of a groove formed in a loading cam and a tension spring. In accordance with the invention, there is provided the brake mechanism wherein the movement of a brake is hindered by the recovering force of the spring and a second guide pin and a hinge having a spaced relationship with each other during a loading or unloading mode of the VCR, and the brake is operated by a position of a leg of the brake depending upon the rotation of the loading cam and the recovering force of the spring during the operating modes of the VCR.

4 Claims, 4 Drawing Sheets

SUPPLY REEL BRAKE MECHANISM FOR A VIDEO CASSETTE RECORDER

FIELD OF THE INVENTION

The present invention relates to a supply reel brake mechanism for a video cassette recorder("VCR"); and, more particularly, to an improved supply reel brake mechanism which carries out the supply reel braking operation through the use of a groove formed in a loading cam and a tension spring.

DESCRIPTION OF THE PRIOR ART

In a conventional deck mechanism for a VCR, a supply reel brake mechanism includes a main brake that functions to control the rotation of the supply reel and an auxiliary brake or a band brake that functions to control the tension of a tape which has been drawn out of a cassette and loaded onto a head drum.

The band brake fixed to a tension arm at its one end and fixed to a chassis base at its the other end is operated by a pivotal movement of the tension arm. The main brake pivotable about a hinge fixed to the chassis base has one end with teeth for braking the supply reel and the other end coupled to a link member. However, since the link member for operating the main brake is connected to a loading cam by means of a number of components, e.g., a gear arm, a coil spring, etc., the production thereof is handicapped by the existence of various difficulties in terms of longer space requirements, manufacturing costs, operational reliability and response time.

SUMMARY OF THE INVENTION

Accordingly, it is a primary object of the invention to provide a supply reel brake mechanism capable of reducing the number of components and the overall manufacturing cost of a VCR by means of using a groove formed in the loading cam.

It is another object of the invention to provide a supply reel brake mechanism capable of providing an accurate and reliable operability of the brake through the provision of a groove along which a leg of the brake is slidably movable.

The above and other objects of the present invention are accomplished by means of a video cassette recorder incorporating therein a supply reel brake mechanism which pins fixed thereto, and a sub-chassis slidably movable forward and backward with respect to the main chassis and having a first and a second rectilinear slots in which the guide pins are inserted, and a supply reel rotatably mounted on the sub-chassis and having teeth formed on its outer periphery, said supply reel brake mechanism comprising: a loading cam having a boss, a spiral inner protrusion, and a generally C-shaped outer protrusion defining a groove among them; a brake pivotable about a hinge fixed to a mounting member of the sub-chassis and including a rack for engaging the teeth of the supply reel, an extension downwardly extending from the brake and having a folded-in edge for slidably contacting with the second guide pin, a leg downwardly extending from the brake and slidably movable along an arcuate slot formed in the sub-chassis; and a tension spring fixed to the sub-chassis at its one end and fixed to the brake at its the other end for pivoting the brake counterclockwise.

BRIEF DESCRIPTION OF THE DRAWINGS

The above and other objects, advantages and features of the present invention will be apparent from the following descriptions, taken in conjunction with the accompanying drawings, wherein.

DETAILED DESCRIPTION OF THE PREFERRED EMBODIMENTS

Figure 1:
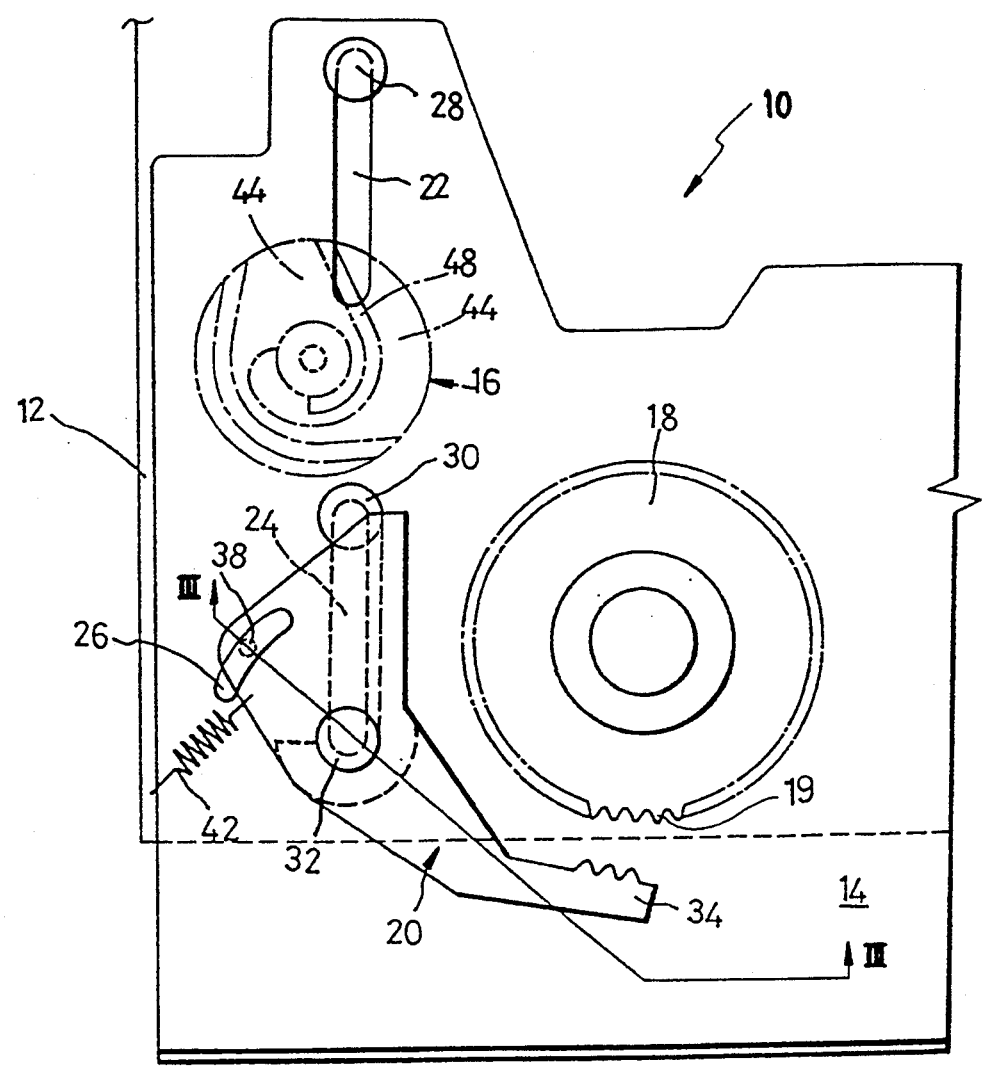
FIG. 1 is a partial plan view of a deck mechanism in accordance with the invention, when the mechanism is in an initial mode.

Referring first to FIG. 1, there is shown a partial plan view of a deck mechanism 10 in accordance with the invention, when the mechanism 10 is in an initial mode. As shown, the deck mechanism 10 has a main chassis 12 at which a head drum (not shown) a loading cam 16 (shown in one dotted and dashed lines) and the other components are mounted, and a sub-chassis 14, slidably movable forward and downward on the main chassis, at which a supply reel 18, a take-up reel(not shown) a supply reel brake 20 and other components are mounted. The sub-chassis 14 has a first and a second rectilinear slots 22, 24 and a arcuate slot 26. A first and a second guide pins 28, 30 are fixed to the main chassis through the slots 22, 24 so that the forward and backward movement of the sub-chassis 14 is guided by the guide pins 28, 30. The brake 20, pivotable about a hinge 32, has a rack 34 for braking the supply reel 18, an extension 36 downwardly extending from the brake 20 and terminating at a folded-in edge 37 (see FIG. 3) which directly contacts with the second guide pin 30, and a leg 38 integrated with the brake 20 and slidably movable along the arcuate slot 26. A spring 42 fixed to the sub-chassis 14 at its one end and fixed to the brake at its the other end causes the brake to be urged counterclockwise.

Figure 2:
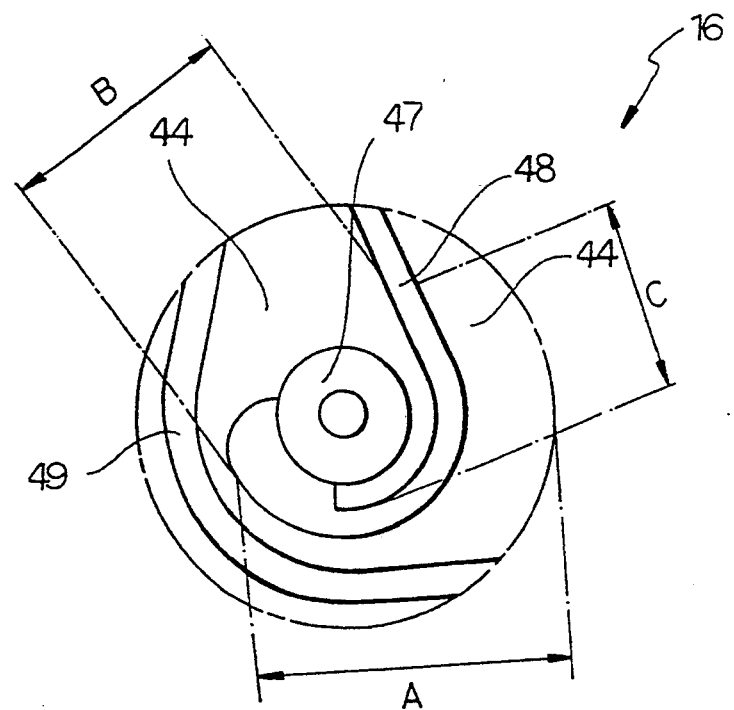
FIG. 2 is a plan view of the loading cam shown in FIG. 1.

FIG. 2 illustrates a plan view of the loading cam 16 shown in FIG. 1. The loading cam 16 mounted on the main chassis 12 has a boss 47, a spiral inner protrusion 48, and a generally C-shaped outer protrusion 49 defining a groove 44 among them. The groove 44 has three regions that function to control the brake 20 depending upon the position of the leg 38, i.e., region A that serves to maintain the brake in a release state during the cassette loading, region B that serves to set the brake to be pulled by the spring counterclockwise, and region C that urges the brake to force its release from the supply reel 18 by pivoting the brake 20 clockwise.

Figure 3:
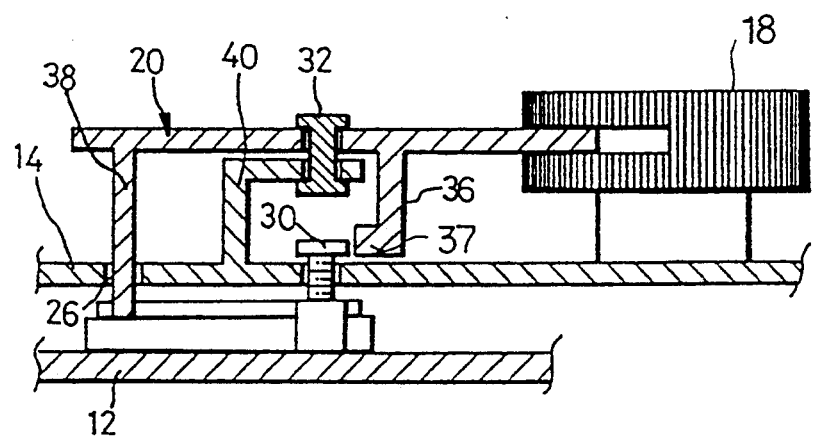
FIG. 3 is a cross-sectional view taken along line III—III of FIG. 1.
Figure 5:
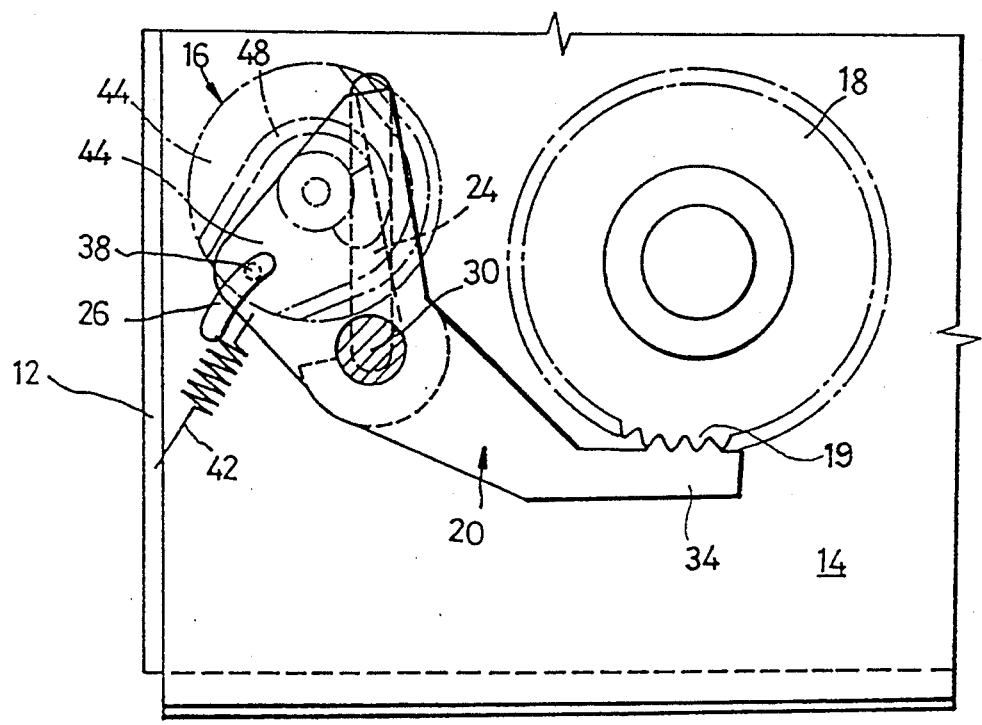
FIG. 5 is a partial plan view of the deck mechanism, when the mechanism is in a stop or still mode.

Referring to FIG. 3, there is shown a cross-sectional view taken along line III—III of FIG. 1. As shown, the sub-chassis 14 is slidably movable along the guide pin 30 through the slot 24 on the main chassis 12. The brake is pivotally fixed to a mounting member 40 which extends upwardly from the sub-chassis 14. The leg 38 pivotable about the hinge 32 is downwardly extended through the arcuate slot 26 to such an extent that a distal end of the leg 38 is slidably movable along the groove of the loading cam. The sliding movement of the folded-in edge 37 is guided by the second guide pin 30 to restrict the pivotal movement of the brake during the cassette loading, since the brake is supported by two points, i.e., the hinge 32 and the second guide pin 30. However, since the hinge 32 and the second guide pin 30 are positioned on the same rectilinear line and have the elevational difference between them, the brake is capable of rotating about the hinge 30 and the second guide pin 32 when they are positioned in a coaxial relationship with each other as shown in FIG. 5. Hereinafter, how the brake operates, depending upon the rotation of the loading cam, will be described with reference to the accompanying drawings.

Figure 4:
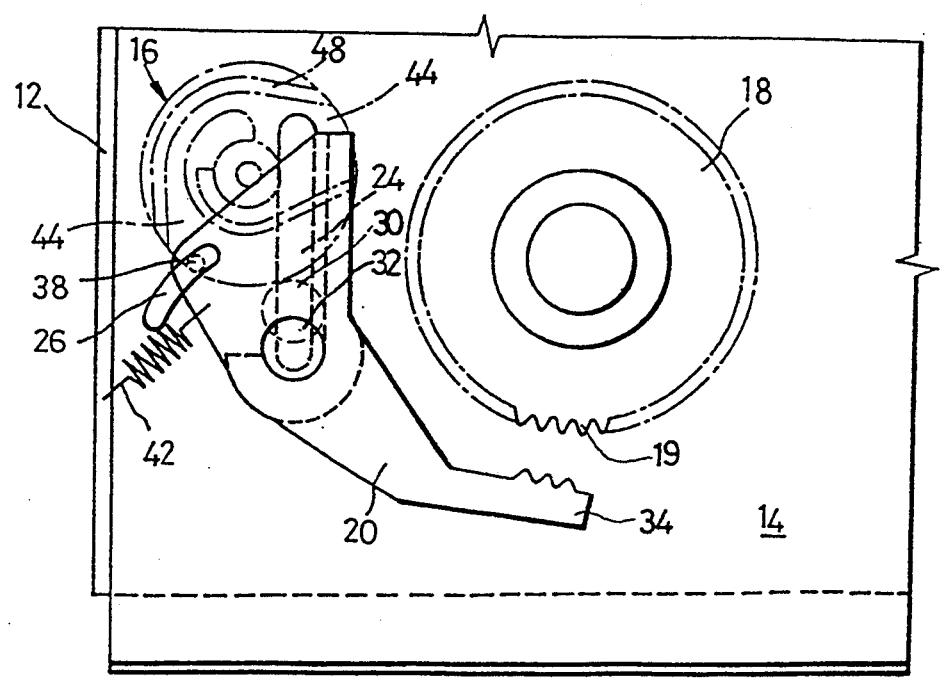
FIG. 4 is a partial plan view of the deck mechanism, during the cassette loading.

As shown in FIG. 1, the brake 20 cannot be pivoted about the hinge 32, since the edge 37 of the extension 36 is in contact with the second guide pin 30 at its distal end. When a cassette(not shown) is inserted into the deck mechanism 10, the sub-chassis 14 is forwardly moved and the loading cam 16 is rotated counterclockwise. The forward movement of the sub-chassis 14 makes the hinge 32 and the second guide pin 30 approach each other and permits the leg to enter the groove 44 of the loading cam 16, as shown in FIG. 4. However, the brake still cannot be pivoted about the hinge 32, since the second guide pin 30 and the hinge 32 are positioned with a spaced relationship from each other. At this time, the leg 38 begins to enter into the region A of the groove 44.

FIG. 5 illustrates a partial plan view of the deck mechanism in a play or still mode. As shown, the sub-chassis 14 is completely moved to the point that the second guide pin 30 and the hinge 32 have a coaxial relationship with each other, and the loading cam is successively rotated counterclockwise, thereby positioning the leg 38 in the region B. Therefore, the recovering force of the spring 42 causes the brake to be pivoted about the hinge 32 counterclockwise so that the rack 34 of the brake 20 is engaged with the teeth 19 of the supply reel 18 to brake the supply reel 18.

Figure 6:
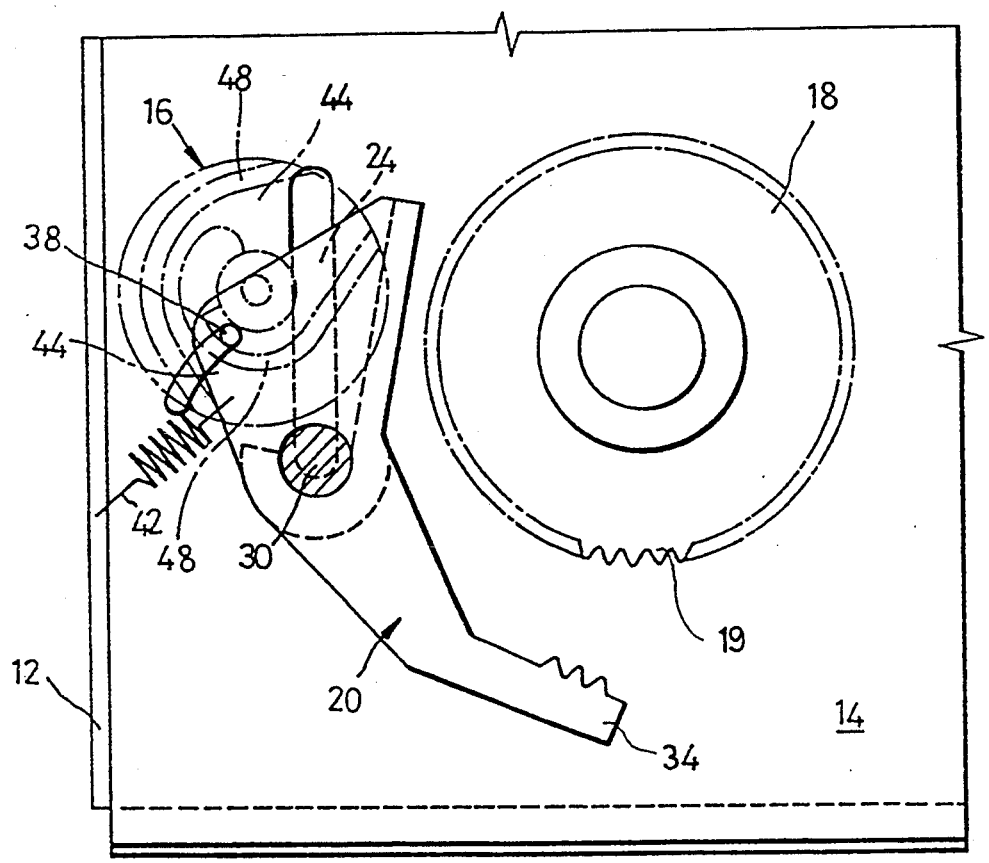
FIG. 6 is a partial plan view of the sub-chassis mechanism, when the mechanism is in a play, record, fast forward, or rewind mode.

Turning now to FIG. 6, there is shown a partial plan view of the deck mechanism, when the leg 38 is located in the region C. The successive rotation of the loading cam allows the leg to be in the region C in the vicinity of the boss 46. Accordingly, the region C formed at an innermost portion of the groove 44 urges the leg 38 of the brake 20 clockwise to release the rack 34 from the teeth 19 of the loading cam 18. When the deck mechanism 10 is in a play, record, fast forward, or rewind mode, the leg 38 is kept at each corresponding portion in the region C of the groove 44 so that the rack 34 of the brake 20 is spaced apart from the teeth 19 of the loading cam 18.

When an operator chooses a certain mode, the loading cam 16 rotates to its corresponding position to control the brake 20. For example, when the operator changes from the play mode to the stop-mode, the loading cam 16 is rotated clockwise until the leg 38 of the brake 20 is positioned in the region B of the groove 44, as shown in FIG. 5. In the case of eject mode, the clockwise rotation of the loading cam 16 and the backward movement of the sub-chassis 14 ensure that the leg 38 of the brake 20 is departed from the groove 44 and the brake 20 is supported by both the second guide pin 30 and the hinge 32, as shown in FIG. 1, in the reverse order of the foregoing operation of the cassette loading.

Although the invention has been shown and described with respect to the exemplary embodiments, it should be understood by those skilled in the art that various changes, modifications and additions may be made, without departing from the spirit and scope of the invention.

What is claimed is:

1. A video cassette recorder incorporating therein a supply reel brake mechanism Which includes a main chassis having a first and a second guide pins fixed thereto, and a sub-chassis slidably movable forward and backward with respect to the main chassis and having a first and a second rectilinear slots in which the guide pins are inserted, and a supply reel rotatably mounted on the sub-chassis and having teeth formed on its outer periphery, said supply reel brake mechanism comprising:
    a loading cam having a boss, a spiral inner protrusion, and a generally C-shaped outer protrusion defining a groove among them;
    a brake pivotable about a hinge fixed to a mounting member of the sub-chassis and including a rack for engaging the teeth of the supply reel, an extension downwardly extending from the brake and having a folded-in edge for slidably contacting with the second guide pin, a leg downwardly extending from the brake and slidably movable along an arcuate slot formed in the sub-chassis; and
    a tension spring fixed to the sub-chassis at its one end and fixed to the brake at its the other end for pivoting the brake counterclockwise.

2. The video cassette recorder as recited in claim 1, wherein the movement of said brake is hindered by the recovering force of the spring and the second guide pin and the hinge having a spaced relationship with each other during the forward and backward movement of the sub-chassis.

3. The video cassette recorder as recited in claim 1, wherein said second guide pin and said hinge have a coaxial relationship with each other and said leg is located in the groove of the loading cam, when the sub-chassis is completely moved forward.

4. The video cassette recorder as recited in claim 1, wherein said brake is controlled by a position of the leg depending upon the rotation of the loading cam and the recovering force of the spiring when the video cassette recoder is in an operating mode.

* * * * *